United States Patent
Le Guilloux et al.

(10) Patent No.: US 10,778,874 B2
(45) Date of Patent: Sep. 15, 2020

(54) PLENOPTIC CAMERA

(71) Applicant: SAFRAN, Paris (FR)

(72) Inventors: Yann Le Guilloux, Moissy-Cramayel (FR); Sylvaine Picard, Moissy-Cramayel (FR)

(73) Assignee: SAFRAN, Paris (FR)

( * ) Notice: Subject to any disclaimer, the term of this patent is extended or adjusted under 35 U.S.C. 154(b) by 121 days.

(21) Appl. No.: 15/758,111

(22) PCT Filed: Sep. 8, 2016

(86) PCT No.: PCT/FR2016/052242
§ 371 (c)(1),
(2) Date: Mar. 7, 2018

(87) PCT Pub. No.: WO2017/042494
PCT Pub. Date: Mar. 16, 2017

(65) Prior Publication Data
US 2018/0249050 A1    Aug. 30, 2018

(30) Foreign Application Priority Data

Sep. 8, 2015    (FR) ...................................... 15 58338

(51) Int. Cl.
*H04N 7/18*    (2006.01)
*H04N 5/225*   (2006.01)
(Continued)

(52) U.S. Cl.
CPC ........... *H04N 5/2254* (2013.01); *G03B 35/08* (2013.01); *G06T 7/557* (2017.01); *H04N 5/2256* (2013.01);
(Continued)

(58) Field of Classification Search
CPC ...................................................... G06T 7/557
See application file for complete search history.

(56) References Cited

U.S. PATENT DOCUMENTS

2006/0192869 A1    8/2006 Yoshino et al.
2009/0167922 A1*   7/2009 Perlman ................. H04N 5/357
                                                              348/340
(Continued)

FOREIGN PATENT DOCUMENTS

GB    2501936 A      11/2013
WO    2006/078537 A2   7/2006
(Continued)

OTHER PUBLICATIONS

French Preliminary Search Report and Written Opinion dated Jul. 5, 2016 in Patent Application No. 1558338 (with English translation of categories of cited documents), 9 pages.

(Continued)

*Primary Examiner* — Fabio S Lima
(74) *Attorney, Agent, or Firm* — Oblon, McClelland, Maier & Neustadt, L.L.P.

(57) ABSTRACT

A plenoptic camera including an optical system receiving light issuing from an object field in which there is an object space intended to be processed via the camera. A matrix photosensitive sensor is composed of pixels arranged in rows and columns and such that each pixel receives the light of a single light ray via the system. The light rays, each associated with their pixel, form intersections in the object space, and the optics are configured so as to minimize the greatest distance between any point of the object space and the closest of the intersections of these light rays. Optical elements are aligned and arranged in rows and columns parallel respectively to the rows and columns of the matrix sensor, forming the intersections in the object field, the distances separating the rows and/or columns being irregular.

13 Claims, 7 Drawing Sheets

(51) Int. Cl.
  *G03B 35/08* (2006.01)
  *H04N 13/232* (2018.01)
  *G06T 7/557* (2017.01)
  *H04N 13/246* (2018.01)

(52) U.S. Cl.
  CPC ......... *H04N 13/232* (2018.05); *H04N 13/246* (2018.05)

(56) References Cited

U.S. PATENT DOCUMENTS

| | | | |
|---|---|---|---|
| 2010/0220212 A1 | 9/2010 | Perlman et al. | |
| 2011/0315855 A1 | 12/2011 | Perlman et al. | |
| 2012/0050562 A1* | 3/2012 | Perwass | H04N 5/2254 348/222.1 |
| 2013/0182170 A1* | 7/2013 | Suzuki | H04N 5/2254 348/340 |
| 2014/0327763 A1* | 11/2014 | Sambongi | H04N 9/045 348/135 |
| 2015/0077600 A1* | 3/2015 | Kobayashi | G02B 5/201 348/273 |
| 2015/0085289 A1* | 3/2015 | Kang | G01B 11/24 356/445 |
| 2015/0256734 A1* | 9/2015 | Fukuhara | H04N 5/2355 348/294 |
| 2016/0205394 A1* | 7/2016 | Meng | H04N 17/002 348/187 |
| 2019/0156501 A1* | 5/2019 | Le Guilloux | G06T 7/593 |

FOREIGN PATENT DOCUMENTS

| | | | | |
|---|---|---|---|---|
| WO | WO-2013167758 A1 | * | 11/2013 | ......... G02B 27/0075 |
| WO | WO-2018024490 A1 | * | 2/2018 | ........... H04N 13/246 |

OTHER PUBLICATIONS

International Search Report dated Jan. 2, 2017 in PCT/FR2016/052242 filed Sep. 8, 2016.

* cited by examiner

PLENOPTIC CAMERA

FIELD OF THE INVENTION

The present invention relates to the field of 3D reconstruction from 2D images, and in particular to plenoptic cameras which allow a 3D scene to be acquired.

PRIOR ART 3D reconstruction from 2D images consists of obtaining a representation in three dimensions of an object or a scene from a set of 2D images of the object or of the scene taken from different points of view.

More generally, one or more 2D representations of an object are available and it is desired to determine the coordinates of the elements visible in these representations in a real 3D space frame of reference.

The points visible in the images are the projections of real points which can then be situated on straight rows. If two or more views of the object are taken, the position in space of the real points can then be obtained by intersection of these straight rows (or triangulation).

Using a plenoptic camera 1 to acquire 2D images taken from different points of view of the object or the scene is known.

Using the plenoptic camera 1 has the advantage of having a setup that is relatively simple to accomplish and requires only a single camera. Moreover, in principle, the extrinsic calibration parameters are known.

As illustrated in FIG. 1, a plenoptic camera 1 captures information relating to the distribution of orientation of the light rays entering into the camera 1. As in a conventional camera, this camera 1 has a main lens 2 which receives light from objects placed in the object field and directs the light received to an image plane of the camera 1. This camera 1 samples the light field.

In this image plane of the lens 2 is placed an array 40 of microlenses 4. Thus, the center of each microlens receives all the rays from the conjugate object point of this center, these rays corresponding to different directions. The microlens then distributes several pixels of a photosensitive sensor 3 the rays from different directions. The light field has then been sampled in position and in orientation. Each pixel thus receives light from a single ray, the association between pixels and rays is essential for three-dimensional reconstruction.

The image taken by the photosensitive sensor 3 therefore contains sufficient information to form images seen from different points of view.

The pixels receiving the light from the same microlens 4 form a group called a macropixel.

To determine the 3D coordinates of a point of the object space, it is necessary that it be imaged by at least two pixels of the photosensitive sensor, hence in two different orientations. To be able to distinguish two contiguous points in the object space, it is necessary that they be imaged on different pixel couples.

As illustrated in FIG. 2, to minimize the blind space between the microlenses 4, the microlenses 4 are aligned in a regular array, the distance between two adjacent microlenses 4 being constant in at least two directions. In particular, the microlenses 4 can be disposed in regularly spaced rows and columns.

Sensors are also known in which the microlenses are not aligned in rows and columns, but rather form a periodic assembly of small matrices (3 by 3 for example).

Now, due to the regularity of the array of microlenses 4, certain points in the object space are imaged by more than two pixels, while certain zones are not imaged by any pixel or by only one pixel. These zones are the blind zones for reconstruction in the object space.

FIG. 3a allows this phenomenon to be visualized. FIG. 3a corresponds to a portion of the object space in which the optical paths of the incident rays on each pixel of the photosensitive sensor 3 have been traced. The intersection points (marked by crosses) between these rays therefore correspond to points of the object space which are imaged on at least two pixels. As can be seen in FIG. 3a, the intersections are badly distributed in the object space. There exist planes (such as planes −16.8 and −16.5 in FIG. 3a) in which the intersection density is high, but there also exist numerous planes (like plane 16.65) in which the intersection density is low, and large zones adjoining these planes in which there are no intersections (such as the zone comprised between the planes −16.75 and −16.65 in FIG. 3a), in other words zones which are not imaged on at least two pixels. This is due in particular to the existence of numerous multiple intersections, which correspond to points in space which are imaged on more than two pixels.

FIG. 3b illustrates the fact that there exist points in which the distance to the closest intersection is on the order of 50 micrometers.

The resolution power of a plenoptic camera, defined as the minimum distance which must separate two contiguous points so that they will be imaged on different couples of pixels, depends on the distribution of intersections in the object space. The plenoptic cameras of the prior art therefore have good resolution in certain planes, but on the other hand have poor overall resolution in space.

DISCLOSURE OF THE INVENTION

One aim of the invention is to propose a plenoptic camera having better resolution in space than the devices of the prior art.

This aim is attained in the scope of the present invention thanks to a plenoptic camera comprising an optical system which receives light from an object field in which there is an object space intended to be processed via the camera, a photosensitive matrix sensor which is composed of pixels arranged in rows and columns and such that each pixel receives the light from a single light ray via the optical system.

Said camera has its optics which comprises focusing optics and an array of optical elements which are positioned in an image plane situated between the focusing optics and the photosensitive sensor.

Each optical element forms on the photosensitive sensor a macropixel image by matching each pixel to its associated light ray.

In the camera, the optical elements are arranged in rows and in columns parallel respectively to the rows and columns of the matrix sensor by forming the intersections in the object field.

In the camera, the distance which separates two adjacent rows of the array of optical elements and/or the distance which separates two adjacent columns of the array of optical elements is irregular in said array, this distance being distinct for at least two pairs of adjacent rows and/or two pairs of adjacent columns of the array of optical elements, the irregularity in separation distance allowing minimization of the largest distance between any point of the object space and the closest of said intersections of said light rays.

The distance between two adjacent rows, respectively two columns, is said to be irregular if it cannot be deduced from knowledge of all the other distances between adjacent rows, respectively columns, or if it is necessary to know the distance between at least twenty adjacent rows, respectively twenty columns, to deduce it.

In one advantageous embodiment, the distance between two columns (respectively rows) is fixed randomly, in particular using a draw according to a uniform law over a predetermined interval.

There is then no observable periodicity in the arrangement of the columns (respectively the rows).

It is considered that the distance that separates two adjacent columns (or rows) of the array of optical elements is irregular, provided that the gap between one value and the mean value is greater than 2% of the mean value (this condition is, however, not sufficient).

With respect to the configuration of the prior art, in which the optical elements are aligned in regularly spaced rows and columns or are disposed in a matrix according to periodic patterns, there exist fewer points in the object space which will be imaged on more than two pixels, but more points in the object space which will be imaged on at least two pixels. It is this object space which is more advantageously processed via the camera.

As it is sufficient that a point of the object space is imaged on two pixels to determine its position in space, the invention therefore allows the resolution of three-dimensional reconstruction of a plenoptic camera to be improved.

In addition, the points in space imaged on at least two pixels are distributed more homogeneously in space, which allows having a better overall resolution in space.

On the one hand, the light rays associated with their pixel form intersections in said object space and on the other hand the optics are created so as to minimize the greatest distance between any point of the object space and the closest of said intersections of light rays.

The invention is advantageously completed by the following characteristics, taken individually or in any one of their technically possible combinations.

Neither the distance between two adjacent rows, nor the distance between two adjacent columns is constant. Thus, in this embodiment, the array of optical elements has irregularities both as to the distance which separates two adjacent rows of the array and as to the distance which separates two adjacent columns. The fact that the array of optical elements includes irregularities in two directions allow a further improvement in the distribution of the points of space imaged on more than two pixels.

The distance between two adjacent rows and/or two adjacent columns can for example be randomly selected. Preferably, this distance is then in a range of values comprised between 95% and 105% of a mean value. The test carried out by the inventors have allowed it to be determined that this configuration would allow an improved resolution of the plenoptic camera.

On the one hand, the macropixel image formed on the photosensitive sensor extends over at least two pixels in the vertical direction and/or in the horizontal direction and on the other hand, the irregular distance in said array separates two adjacent rows of the array of optical elements in correspondence with their macropixel images of at least two pixels in the vertical direction and/or separates two adjacent columns of the array of optical elements in correspondence with their macropixel images of at least two pixels in the horizontal direction.

The optical elements are microlenses or pinholes.

The association between a ray and a pixel is dynamically selected in a set of possible associations and makes it possible to obtain one image or several images of the object field.

A set of controllable shutter elements positioned facing the optical elements allows the dynamic selection of a single ray for each pixel by allowing the selection of an association in the set of possible associations, the images being formed by the optical elements on the detector and being able to have overlaps.

Thus, a configuration of optical elements is first designed, possibly having overlaps between the macropixels, and a matrix mask is placed in front of or behind the plane of the array of optical elements. In controlling the state of the cells of the matrix mask, the rays from the optical elements are dynamically modified so as to distribute the intersections in space.

The association between a ray and pixels is one-to-one for at least two spectral bands, the associations corresponding to those spectral bands differing for at least one pixel.

A set of chromatic filter elements positioned facing the optical elements ensures the uniqueness of the ray corresponding to each pixel in each of the spectral bands, allowing to obtain one image or several images of the object field, the images formed by the optical elements on the detector possibly having overlaps.

Thus, one configuration is dynamically switched to another, by changing the wavelength of the lighting to make it correspond to the wavelength of the filters positioned in front of the array of optical elements corresponding to the desired configuration.

Considering the implementation differently, it is possible to provide that the plenoptic camera includes two arrays of optical elements contained in the same plane, a chromatic filter allowing only wavelengths in a first frequency band to pass being positioned in front of the optical elements of the first array, a band-pass filter allowing only the wave-lengths of a second frequency band, different from the first frequency band, to pass being positioned in front of the optical elements of the second array.

The invention also proposes a three-dimensional acquisition device, including a plenoptic camera as described above and a calculator configured to determine, from the provided image and/or a series of images provided by the plenoptic camera, a distance between a point of the object field and the plenoptic camera.

The invention also proposes a method for calibrating a plenoptic camera as described above, including steps of:
  lighting a single point of the object field;
  listing the illuminated pixels of the photosensitive sensor;
  associating the illuminated pixels of the photosensitive sensor with the point of the object field;
  repeating the preceding steps for a sample of points of the object field.

The invention also proposes the use of a three-dimensional acquisition device as described above for verifying shape and in particular for verifying the shape of a turbine engine blade.

DESCRIPTION OF THE FIGURES

Other objectives, features and advantages will be revealed by the detailed description that follows with reference to the non-limiting drawings given by way of illustration, among which.

DETAILED DESCRIPTION OF THE INVENTION

Figure 1:
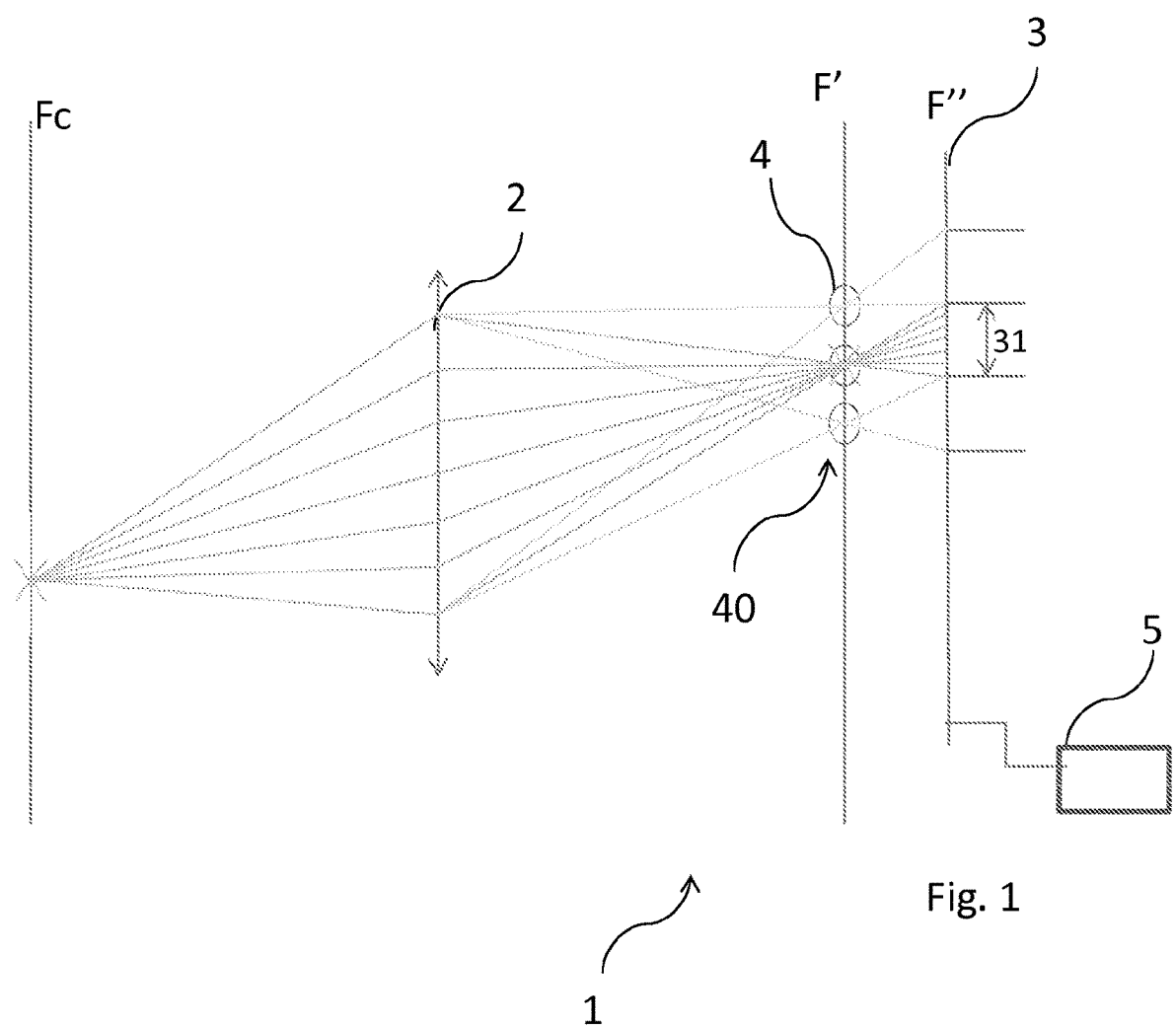
FIG. 1, discussed above, illustrates a plenoptic camera of the prior art.
Figure 2:
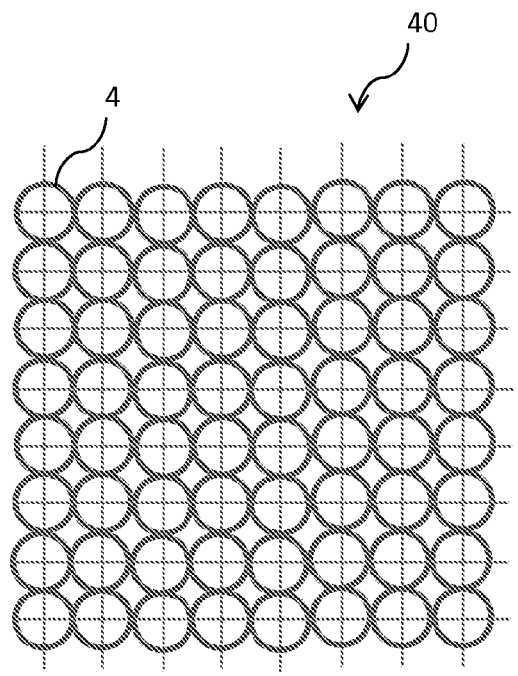
FIG. 2, discussed above, is a front view of an array of microlenses of the prior art.
Figure 3A:
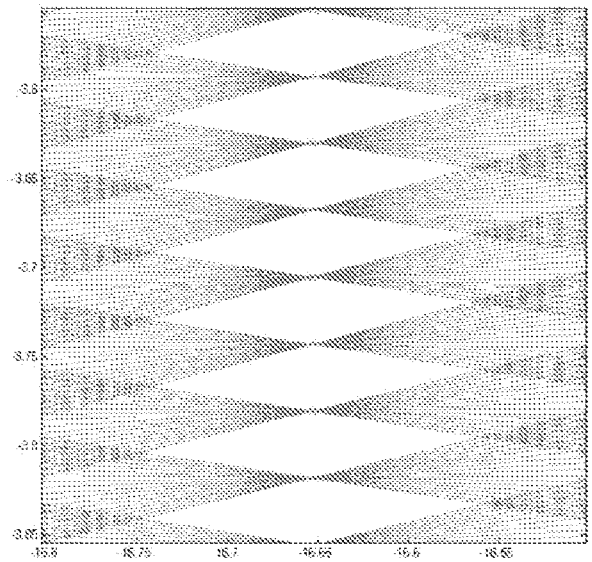
FIG. 3a, discussed above, illustrates the distribution in the object space of the intersections of rays for a plenoptic camera of the prior art.
Figure 3B:
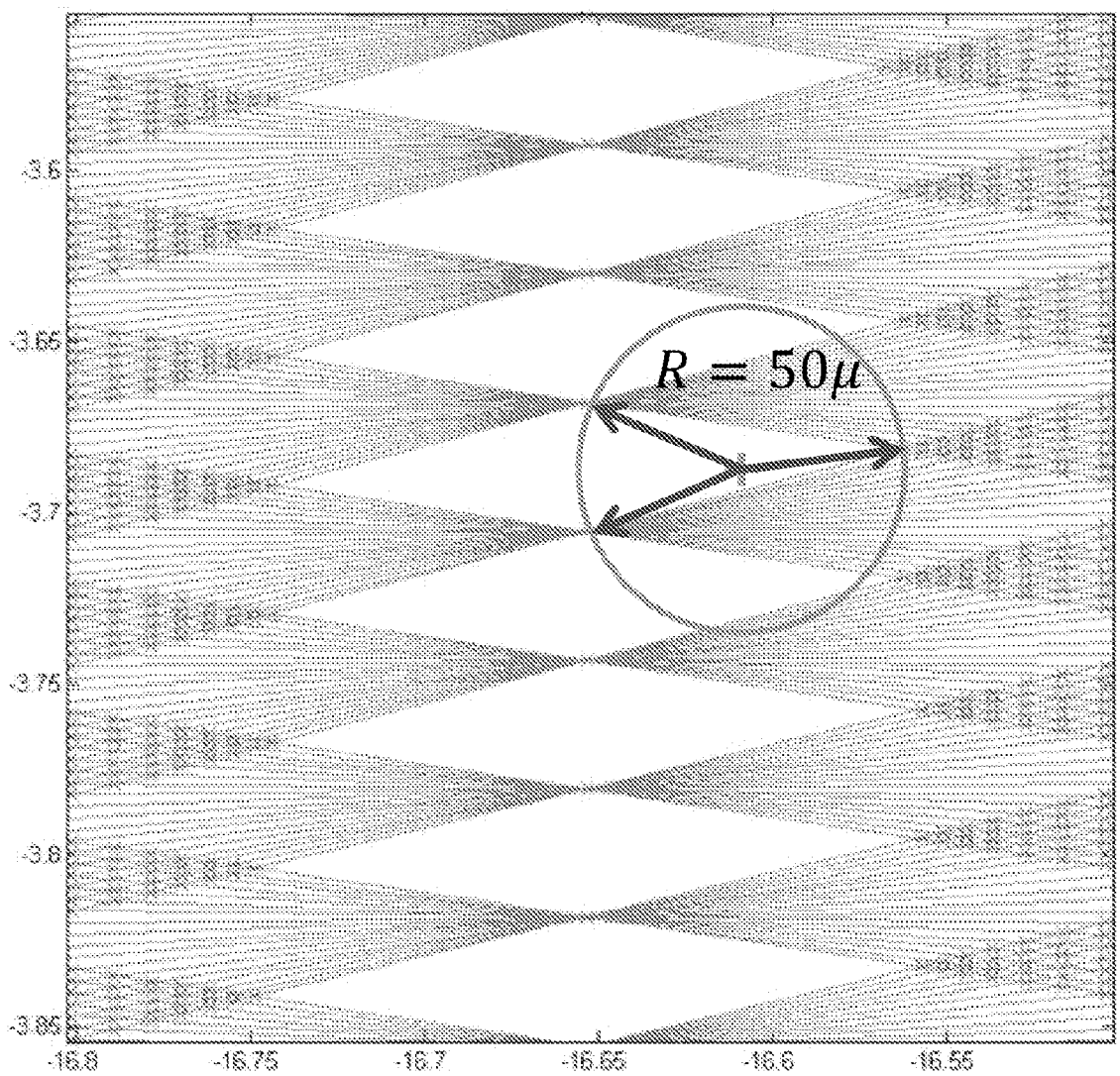
FIG. 3b is an enlargement of FIG. 3a, illustrating the distances of the intersection points.
Figure 4:
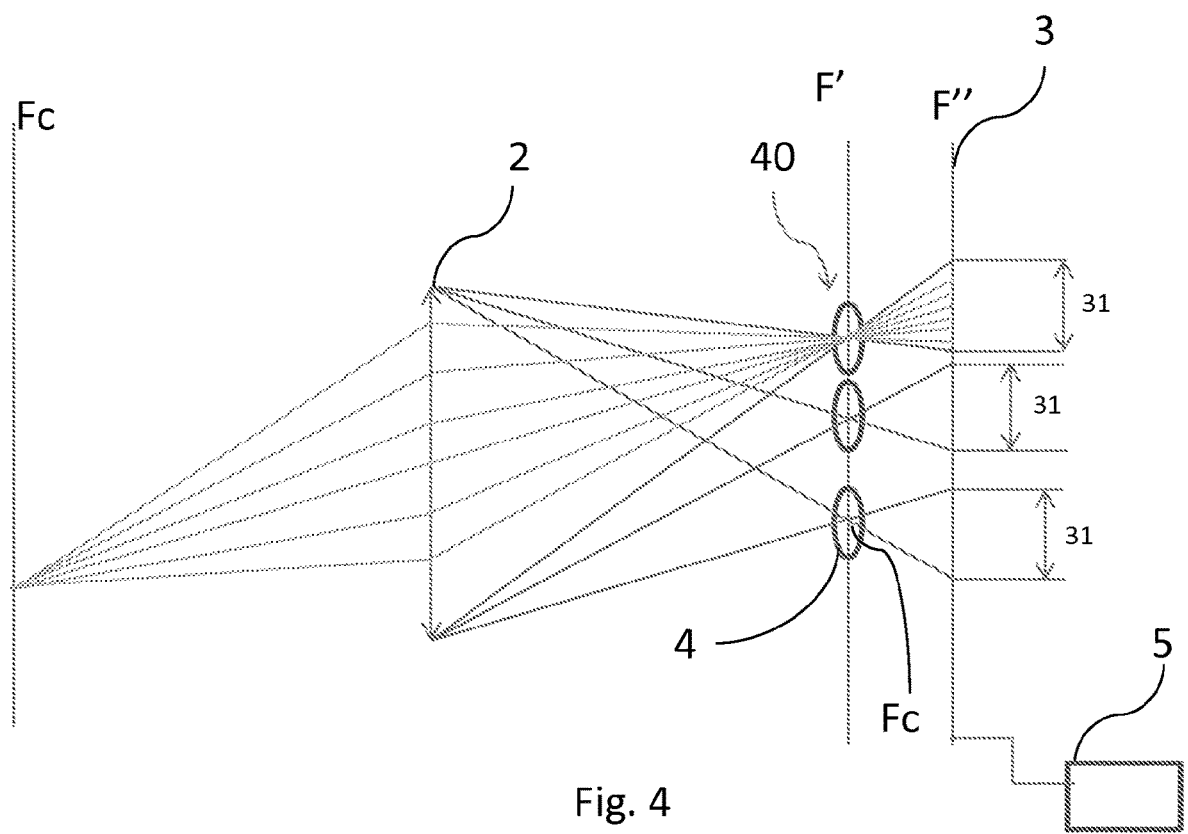
FIG. 4 illustrates a plenoptic camera conforming to an embodiment of the invention.

As illustrated in FIG. 4, a plenoptic camera 1 usually comprises focusing optics 2, a photosensitive sensor 3, and an array of optical elements 40. An optical system comprises the focusing optics 2 and the array of optical elements 40.

The focusing optics 2 is conventionally an optical lens or a combination of optical lenses, which receives light from objects placed in an object field.

The plenoptic camera 1 has its optical elements 40 disposed in an image plane F' of the plenoptic camera between the focusing optics 2 and the photosensitive sensor 3, and parallel to the sensor.

The photosensitive sensor 3 is situated at a plane labeled F" in the examples which are in the figures. Each optical element 4 forms on the photosensitive sensor 3 and image of the focusing optics 2.

As illustrated in FIG. 4, a point comprised in the plane Fc of the plane of optical elements is imaged by a single microlens constituting a single optical element 4. The parameters of the camera, in particular the focal distance of the focusing optics 2, and that of the microlenses 4 are selected so that the images formed by the microlenses on the photosensitive sensor 3 do not overlap. The pixels receiving the light from the same optical element 4 form a group called a macropixel and each optical element 4 forms on the photosensitive sensor 3 a macropixel image extending over at least two pixels for said group, in the horizontal direction and/or in the vertical direction.

The photosensitive sensor 3 is of the matrix type, being composed of pixels arranged in rows and columns, such that each pixel receives light from a single light ray via the optical system.

The image taken by the photosensitive sensor 3 therefore contains sufficient information to form images seen from different points of view. The array of optical elements 40 is placed at a short distance (on the order of 0.5 mm) from the photosensitive sensor 3.

The optical elements 4 can in particular be microlenses or pinholes. In the case where the optical elements 4 are microlenses, these can be spherical or have more complex shape allowing a connection between two adjacent microlenses 4. The microlenses typically have a diameter on the order of a fraction of a millimeter.

In the case where optical elements 4 are pinholes, the array of optical elements 40 is an opaque flat surface in which are provided holes of very small diameter, typically spaced on the order of a fraction of a millimeter.

The photosensitive sensor 3 captures the light received to produce an image. The photosensitive sensor 3 is a matrix sensor and typically a CCD matrix. The photosensitive sensor 3 is a photosensitive electronic component composed of photo-sites suitable for converting electromagnetic radiation (UV, visible or IR) into an analogous electrical signal. This signal is then digitized by an analog-digital converter to obtain a digital image composed of pixels, each pixel corresponding to a photo-site of the photosensitive sensor 3.

As illustrated in FIG. 4, the optical elements 4 are disposed in a coplanar manner, in a plane substantially parallel to the photosensitive sensor 3.

Figure 5:
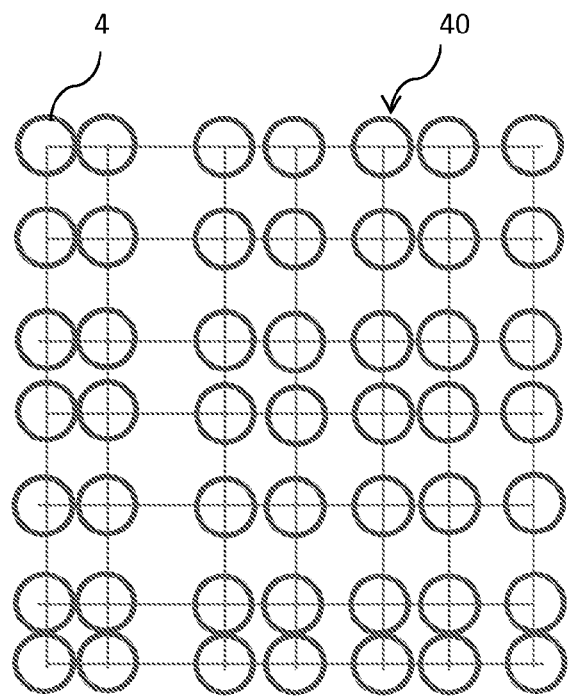
FIG. 5 is a front view of an array of microlenses conforming to an embodiment of the invention.

As illustrated in FIG. 5, the optical elements 4 are disposed so that their optical centers are aligned in rows and in columns. The optical center of an optical element is the particular point of an optical element such that a light ray incident at this point is not deflected, its incident and emergent portions being mutually parallel.

In the case where the optical elements 4 are microlenses, the optical center of the microlens is the intersection point between the plane of the microlens and the optical axis.

In the case where the optical elements 4 are pinholes, the optical center of the pinhole is the center of the hole.

In a first embodiment, the distance between two adjacent rows is not constant, while the distance between two columns is constant, or alternatively, the distance between two adjacent rows is constant, but the distance between two columns is not constant.

In a second embodiment, neither the distance between two adjacent rows, nor the distance between two adjacent columns is constant.

The distance between two adjacent rows and that between two columns is typically less than a millimeter.

The distance between two adjacent rows and/or that between two adjacent columns is typically selected from a range of values comprised between + and −5% of a mean value.

Alternatively, the distance between two adjacent rows and/or that between two adjacent columns is typically selected in a range of values comprised between + and −10% of a mean value.

The distance between two adjacent rows, respectively two columns, is irregular if it is not possible to deduce it from the knowledge of all the other distances between adjacent rows, respectively columns, or if it is necessary to know the distances between at least twenty adjacent rows, respectively twenty columns, to deduce it.

The distance between two adjacent rows, and/or between two adjacent columns, can for example be randomly selected. What is meant by that is that in this case, the distribution of distances between two adjacent rows and/or between two adjacent columns does not have any identifiable structure, regularity or prediction rule, in other words the distance between two adjacent rows and/or between two adjacent columns is obtained by chance. In fact, the tests carried out by the inventors have allowed it to be determined that this configuration allowed a greater three-dimensional reconstruction resolution of the plenoptic camera.

The distance between two adjacent rows and/or that between two adjacent columns is typically randomly selected in a range of values comprised between + and −5% about a mean value.

Alternatively, the distance between two adjacent rows and/or that between two adjacent columns is randomly selected in a range of values comprised between + and −10% of a mean value.

An advantageous embodiment therefore consists of randomly determining the distance between two columns (respectively rows), particularly by using a draw according to a uniform law over a predetermined range of values. In other words, said distance is a function of a random value.

A concrete example of an irregular position is given at present.

It is desired to place K columns of microlenses of radius R. The position P1 of the first column is selected arbitrarily. For the K−1 other microlenses a value V between $[0, \delta]$ is selected according to a uniform law and the center of the current lens is placed so that it is distant from the center of the previous lens by 2R+V. The distance between two lenses cannot be deduced from the distance between the other lenses because it depends on the random variable V selected uniformly in the interval $[0, \delta]$.

There is then no periodicity observable in the arrangement of the columns (respectively of the rows).

Figure 6A:
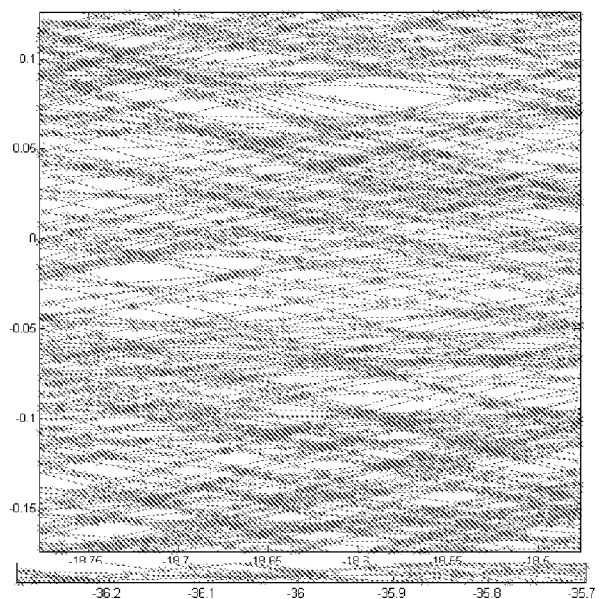
FIG. 6a illustrates the distribution in the object space of the intersections of rays for a plenoptic camera conforming to the invention.

FIG. 6a corresponds to a portion of the object space in which have been traced light rays corresponding to all the pixels. The points (marked by crosses) of intersection between these rays correspond to the points of the object space with are imaged on at least two pixels. As can be seen in FIG. 6a, the intersections are distributed more homogeneously in space, which makes it possible to have a better overall resolution in space.

Compared to a configuration in which the optical elements are aligned in regularly spaced rows and columns, there exist fewer points in the object space which are imaged over more than two pixels, but more points of the object space which are imaged over at least two pixels.

As it is sufficient that a point of the object space is imaged on two pixels to be able to determine its position in space, the invention therefore allows an improvement in the three-dimensional reconstruction resolution of a plenoptic camera.

Figure 6B:
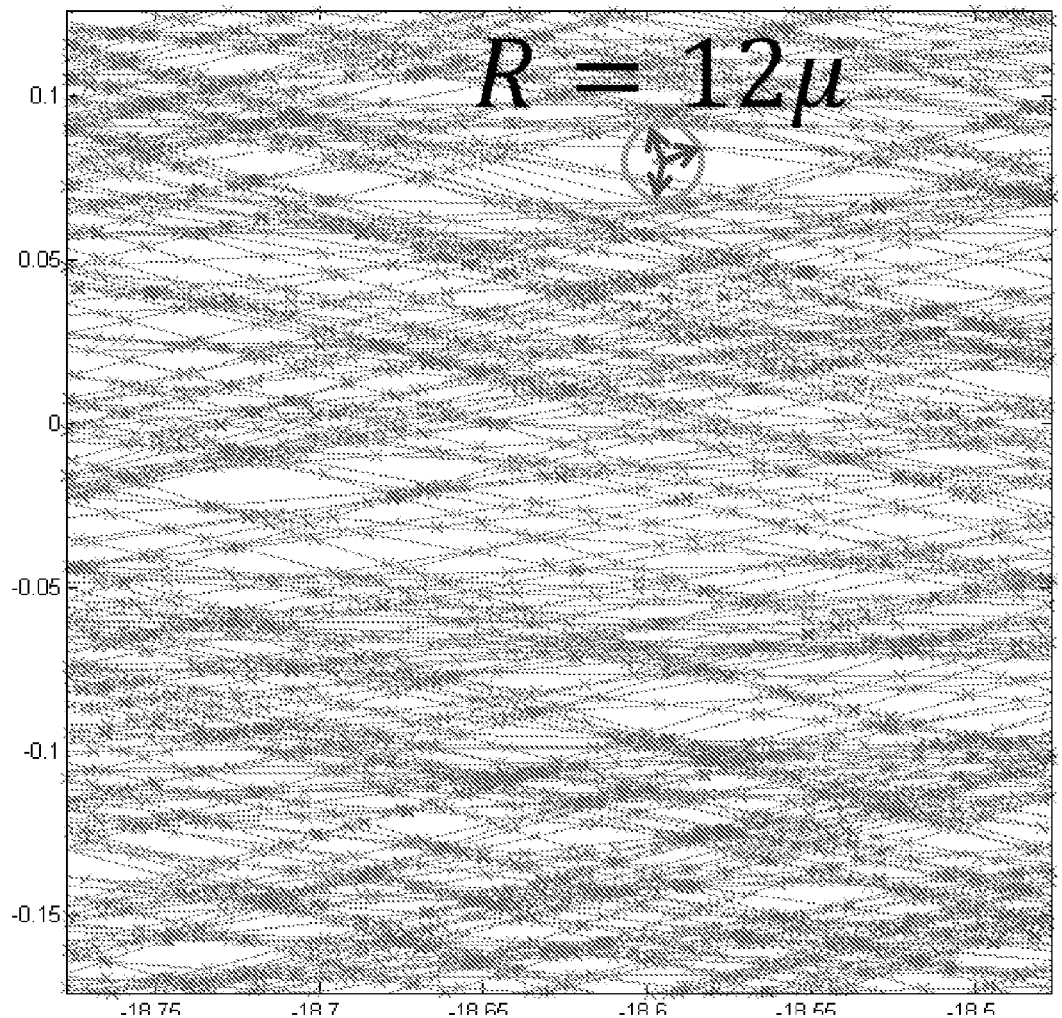
FIG. 6b is an enlargement of FIG. 6a, illustrating reduced distances of the intersection points with respect to the illustration of FIG. 3b.

FIG. 6b, an enlargement of FIG. 6a, illustrates that the point of the volume farthest away from any intersection is situated only 12 micrometers from the closest intersection. The three-dimensional reconstruction resolution is therefore noticeably better.

The disposition of the optical elements 4 is advantageously modified dynamically to allow adaptation to particular situations.

In fact, the disposition of the optical elements 4 determines the positioning of the intersections, and therefore the resolution of the three-dimensional measurement in space. The configuration of the array of optical elements 40 will therefore be selected depending on the distribution of the intersections that is desired. In particular, a configuration can generate a strong concentration of intersections in a particular zone of space and would be particularly attractive for acquiring an object contained in this zone of space.

Advantageously, the optical system processes the light from the object field in which is the object space to be processed via the camera. On the one hand, the light rays each associated with its pixel form intersections in said object space and on the other hand the optics is implemented so as to minimize the greatest distance between any point of the object space and the closest of said intersections of these light rays.

Each optical element 4 forms on the photosensitive sensor 3 a macropixel image extending over at least two pixels in the vertical direction and/or in the horizontal direction by having its associated light ray correspond to each pixel. The optical elements 4 are aligned arranged in rows and in columns parallel respectively to the rows and columns of the matrix sensor 3, forming intersections in the object field.

The distance which separates two adjacent rows of the array of optical elements in correspondence with their macropixel images of at least two pixels in the vertical direction and/or the horizontal direction is irregular in said array. This irregularity in said distances separating said rows and/or columns allows minimization of the greatest distance between any point of the object space and the closest of said intersections of these light rays.

To modify the configuration of the optical elements 4, it is possible to displace the optical elements 4. A displacement of the optical elements 4 can be obtained in particular by means of actuators suitable for independently displacing each optical element 4.

Figure 7:
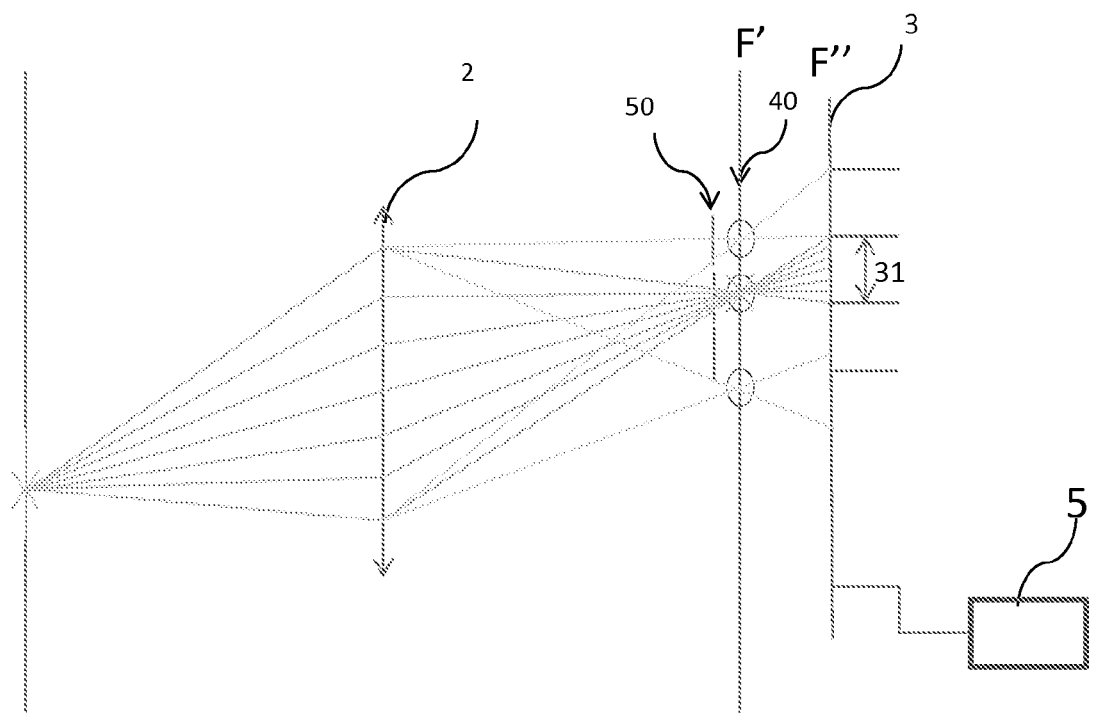
FIG. 7 illustrates a plenoptic camera including a matrix mask conforming to an embodiment of the invention.

It is also possible to use a matrix mask 50 positioned in front of or behind the array of optical elements 40, as illustrated in FIG. 7, and consisting of cells which can be controlled independently of each other to allow light to pass or not, such as for example a screen made of liquid crystals.

Thus, a configuration of optical elements 4 is designed first, possibly having overlaps between the macropixels, and a matrix mask 50 is placed, in front of or behind the plane of the array of optical elements 40.

By controlling the state of the cells of the matrix mask 50, the rays from the optical elements 40 are dynamically modified so as to prevent more than one ray from reaching each pixel and distributing the intersections in space.

By combining the images obtained for several masking states, the set of intersections of rays is enriched and the resolution of the three-dimensional reconstruction is improved.

Advantageously, the association between the ray and the pixel is dynamically selected in a set of possible associations and makes it possible to obtain one image or several images of the object field.

Advantageously, a set of controllable shutter elements can be provided positioned facing the optical elements 4 so as to allow the dynamic selection of a single ray for each pixel by allowing the selection of an association in the set of possible associations. The images being formed by the optical elements 4 on the detector 3, they can have overlaps.

Figure 8:
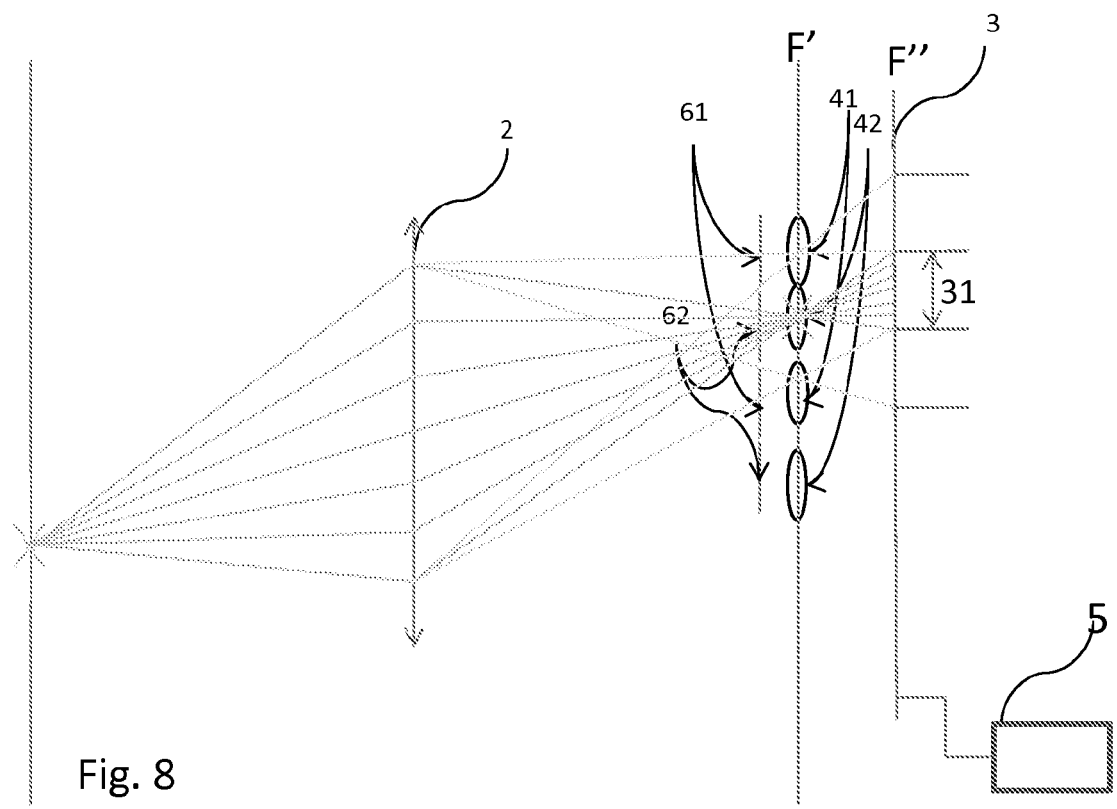
FIG. 8 a plenoptic camera including chromatic filters in conformity with an embodiment of the invention.

One other means of changing dynamically the geometry of optical elements 4 is to position, as illustrated in FIG. 8, two arrays of optical elements 41, 42 in the same plane, and to position, in front of each optical element 4 of the first array 41, a band-pass filter 61 allowing only the wavelengths in a first frequency band to pass, and in front of each optical element 4 of the second array 42 a band-pass filter 62 allowing only the wavelengths in a second frequency band different from the first frequency band to pass. The arrays 41 and 42 are implemented so as to prevent more than one ray in each frequency band from reaching a pixel.

Advantageously, the association between ray and pixels is one-to-one for at least two spectral bands, the associations corresponding to those spectral bands differing for at least one pixel.

Thus, two (or more) configurations of optical elements 4 are designed first, possibly having overlaps between the macropixels, and one configuration is dynamically switched into the other by changing the wavelength of the light from the object field to make it correspond to the wavelength of the filters of the desired configuration.

Advantageously, it can be provided that a set of chromatic filter elements is positioned facing the optical elements 4 ensures the uniqueness of the ray corresponding to each pixel in each of the spectral bands, allowing to obtain one image or several images of the object field, the images formed by the optical elements 4 on the detector 3 possibly having overlaps.

During a calibration step, it is determined, for each point of the object field, the pixels on which the point of the object field is imaged. Each point of the object field is associated with the pixels on which said point of the object field is imaged. To be able to determine the 3D coordinates of a point of the object field requires at a minimum that the point of the object field be imaged on two different pixels.

In particular, it is possible to carry out the calibration by lighting a single point of the object field at a time and listing the illuminated pixels of the photosensitive sensor 3, this for a sample of point of the object space corresponding to the desired resolution.

To this end, a screen is positioned in a plane normal to the observation direction of the camera 1, and this screen is progressively displaced toward the sensor 3 by steps smaller than the distance resolution desired.

For each position of this screen, hence for each position of the camera 1, each point of the screen is selectively lighted in turn. For each point of the screen, the two best-lit pixels of the sensor 3 are determined. If their lighting level is sufficient, in practice greater than a selected threshold, the point is associated to the couple of illuminated pixels. A table is thus created associating the couple of pixels of the photosensitive sensor 2 on which the point is imaged with a point of the object field.

A three-dimensional acquisition device includes a plenoptic camera 1 and a calculator 5 configured to determine, based on the image supplies or the set of provided images by the photosensitive sensor 3, a distance between the point of the object field and the plenoptic camera 1.

The calculator 5 is configured to implement the steps of association and three-dimensional reconstruction as described above.

During an association step, the calculator 5 associates with each other the different pixels which correspond to the same point of the object field. This is what allows the determination of the 3D coordinates of the scene by triangulation.

The different pixels which correspond to the same point of the object field are associated in the conventional manner.

During a three-dimensional reconstruction step, the calculator 5 determines, by triangulation, the 3D coordinates of the points of the object field based on the associations performed and the calibration parameters of the plenoptic camera 1. The points visible on the images being the projections of the point of the object field, the position in space of the point of the object field is obtained by intersection of the light rays associated with the image pixels of the point of the object field.

The invention claimed is:

1. A plenoptic camera comprising:
an optical system which receives light from an object field wherein an object space is intended to be processed via the camera; and
a photosensitive matrix sensor which is composed of pixels arranged in rows and columns and such that each pixel receives the light from a single light ray via the optical system, wherein:
said optical system comprises focusing optics;
said optical system comprises an array of optical elements which are positioned in an image plane situated between the focusing optics and the photosensitive matrix sensor;
the image plane is parallel to the photosensitive matrix sensor;
each optical element forms on the photosensitive matrix sensor a macropixel image by matching each pixel to its associated light ray;
the array of optical elements is arranged so that optical centers of the optical elements are aligned in parallel rows and in parallel columns;
the array of optical elements comprises at least a first row, a second row, and a third row, the first row being adjacent to the second row, and the second row being adjacent to the third row;
the array of optical elements comprises at least a first column, a second column, and a third column, the first column being adjacent to the second column, and the second column being adjacent to the third column; and
the rows of the array of optical elements are irregularly spaced, such that a distance between the first row and the second row is different from a distance between the second row and the third row; or
the columns of the array of optical elements are irregularly spaced, such that a distance between the first column and the second column is different from a distance between the second column and the third column.

2. The plenoptic camera according to claim 1, wherein the array of optical elements has irregularities both as to the distance which separates two adjacent rows of the array and as to the distance which separates two adjacent columns.

3. The plenoptic camera according to claim 1, wherein the distance between two adjacent columns or rows is a function of a random value.

4. The plenoptic camera according to claim 1, wherein the macropixel image formed on the photosensitive matrix sensor extends over at least two pixels in at least one of a vertical direction or a horizontal direction, and the irregular distance in said array separates at least one of two adjacent rows of the array of optical elements in correspondence with the macropixel images of at least two pixels in the vertical direction or two adjacent columns of the array of optical elements in correspondence with the macropixel images of at least two pixels in the horizontal direction.

5. The plenoptic camera according to claim 1, wherein the distance between at least one of two adjacent rows or two adjacent columns is randomly selected.

6. The plenoptic camera according to claim 1, wherein the distance between at least one of two adjacent rows or two adjacent columns is randomly selected in a range of values comprised between 95% and 105% of a mean value.

7. The plenoptic camera according to claim 1, wherein the optical elements are microlenses.

8. The plenoptic camera according to claim 1, wherein the optical elements are pinholes.

9. The plenoptic camera according to claim 1, wherein an association between a ray and a pixel is dynamically selected in a set of possible associations for obtaining one image or several images of the object field.

10. The plenoptic camera according to claim 9, wherein a set of controllable shutter elements positioned facing the optical elements allows the dynamic selection of a single ray for each pixel by allowing the selection of the association in the set of possible associations, the images being formed by the optical elements on the detector and being able to have overlaps.

11. The plenoptic camera according to claim 1, wherein an association between a ray and pixels is one-to-one for at least two spectral bands, the associations corresponding to those spectral bands differing for at least one pixel.

12. The plenoptic camera according to claim 11, wherein a set of chromatic filter elements positioned facing the optical elements ensures uniqueness of the ray corresponding to each pixel in each of the spectral bands, allowing to obtain one image or several images of the object field, the images formed by the optical elements on the detector possibly having overlaps.

13. A three-dimensional acquisition device comprising:
a plenoptic camera according to claim 1; and
a calculator configured to determine, from at least one image provided by the plenoptic camera, a distance between a point of the object field and the plenoptic camera.

* * * * *